United States Patent
Ameixiera

(10) Patent No.: US 9,686,124 B2
(45) Date of Patent: Jun. 20, 2017

(54) SYSTEMS AND METHODS FOR MANAGING A NETWORK OF MOVING THINGS

(71) Applicant: Veniam, Inc., Mountain View State, CA (US)

(72) Inventor: Carlos Ameixiera, Oporto (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 15/141,368

(22) Filed: Apr. 28, 2016

(65) Prior Publication Data

US 2017/0085415 A1 Mar. 23, 2017

Related U.S. Application Data

(60) Provisional application No. 62/222,016, filed on Sep. 22, 2015.

(51) Int. Cl.
| | |
|---|---|
| *G06F 15/173* | (2006.01) |
| *H04L 12/24* | (2006.01) |
| *H04W 40/24* | (2009.01) |
| *H04L 29/08* | (2006.01) |
| *H04W 56/00* | (2009.01) |
| *H04W 84/00* | (2009.01) |

(52) U.S. Cl.
CPC .......... *H04L 41/048* (2013.01); *H04L 67/104* (2013.01); *H04W 40/244* (2013.01); *H04W 56/0025* (2013.01); *H04W 84/005* (2013.01)

(58) Field of Classification Search
USPC .......... 709/206, 223, 224, 229, 238
See application file for complete search history.

(56) References Cited

U.S. PATENT DOCUMENTS

| | | | | |
|---|---|---|---|---|
| 8,693,453 | B2* | 4/2014 | Priyantha | H04W 52/0261 370/338 |
| 2004/0236547 | A1* | 11/2004 | Rappaport | G06F 17/509 703/2 |
| 2006/0140215 | A1* | 6/2006 | Fleming | H04W 52/0232 370/468 |
| 2008/0232286 | A1 | 9/2008 | Habetha et al. | |
| 2008/0259877 | A1 | 10/2008 | Habetha | |
| 2013/0094536 | A1 | 4/2013 | Hui et al. | |
| 2014/0080491 | A1 | 3/2014 | Tinnakornsrisuphap et al. | |
| 2016/0127875 | A1* | 5/2016 | Zampini, II | H04W 4/043 370/311 |

OTHER PUBLICATIONS

PCT, Notification of Transmittal of the International Search Report and the Written Opinion of the International Searching Authority, or the Declaration, in Application No. PCT/US16/52900, dated Feb. 8, 2017 (19 pages).

* cited by examiner

*Primary Examiner* — Liangche A Wang
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

19 Claims, 14 Drawing Sheets

SYSTEMS AND METHODS FOR MANAGING A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/222,016, titled "Systems and Methods for Synchronizing a Network of Moving Things," filed on Sep. 22, 2015," which is hereby incorporated herein by reference in its entirety. The present application is also related to U.S. Provisional Patent Application Ser. No. 62/222,192, titled "Communication Network of Moving Things," filed on Sep. 22, 2015; U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
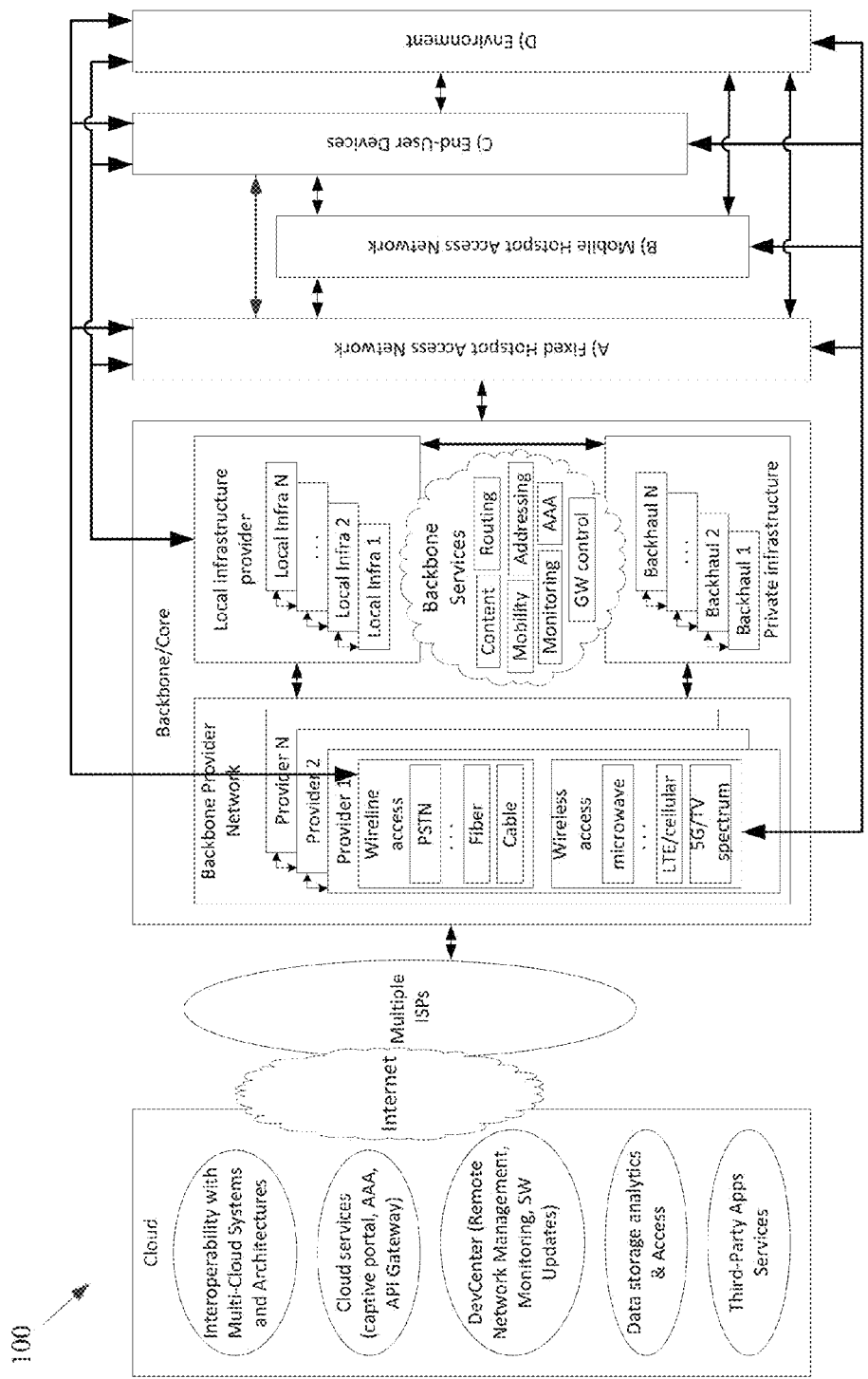
FIG. 1 shows a block diagram of a communication network, in accordance with various aspects of this disclosure.

Various aspects of this disclosure provide communication network architectures, systems and methods for supporting a network of mobile and/or static nodes. Various aspects of this disclosure provide systems and methods for managing a network of moving things. As non-limiting examples, various aspects of this disclosure provide systems and methods for providing context awareness in a moving network and making network management decisions based at least in part on such awareness.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with $10x$ the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
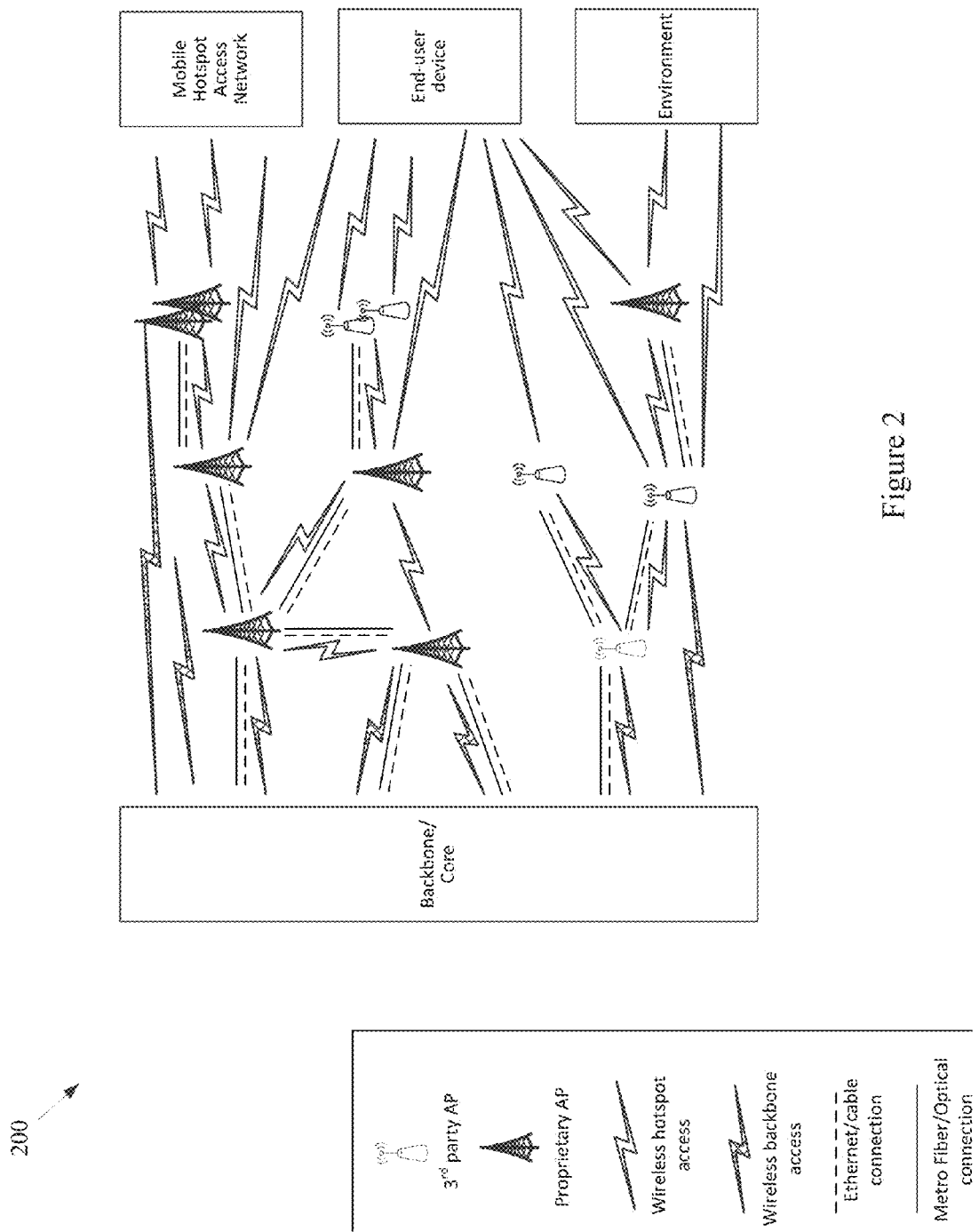
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.)

may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors; road maintenance networks, devices, and sensors, traffic management networks, devices, and sensors; advertising networks, devices and sensors; etc.).

Figure 3:
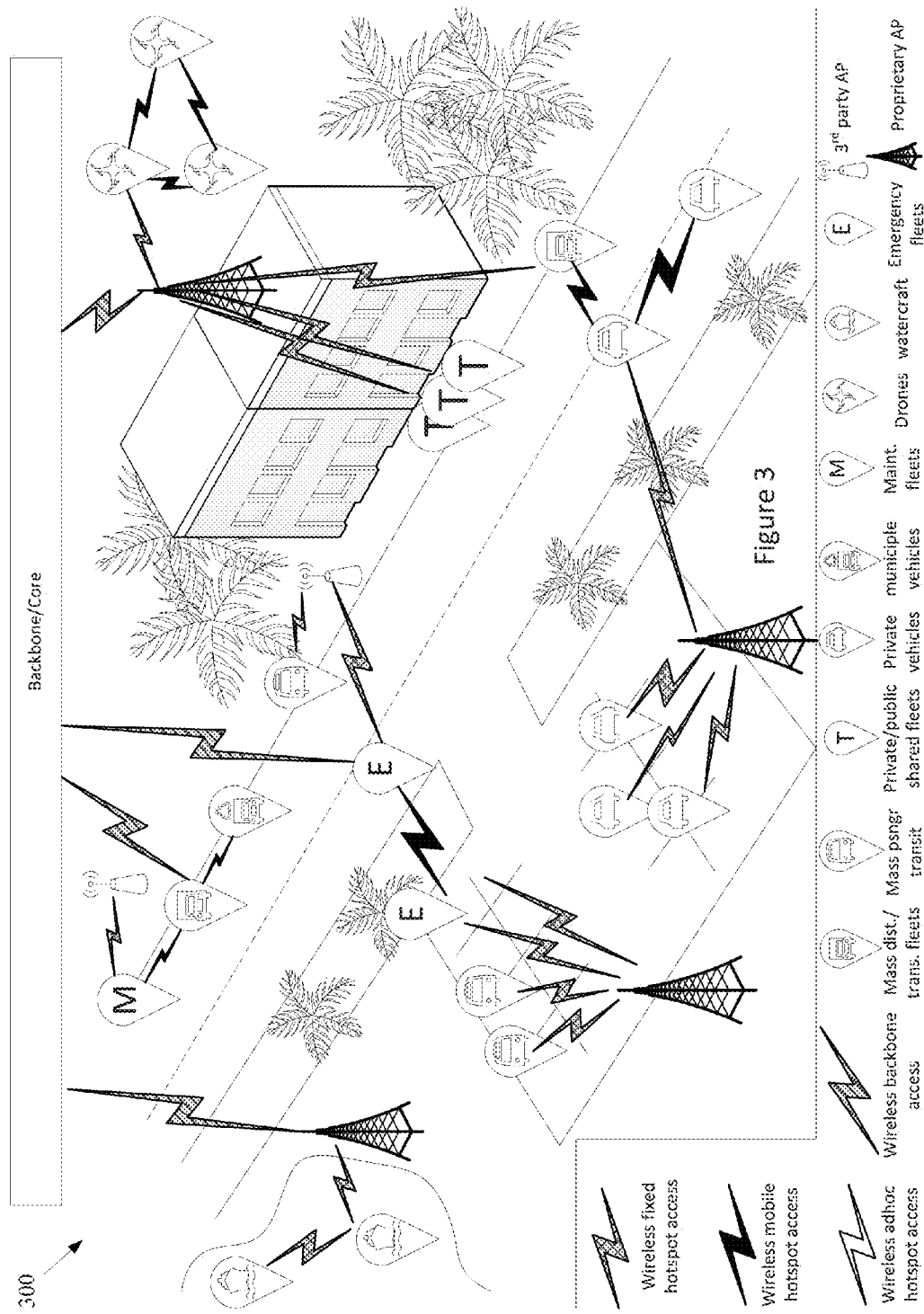
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
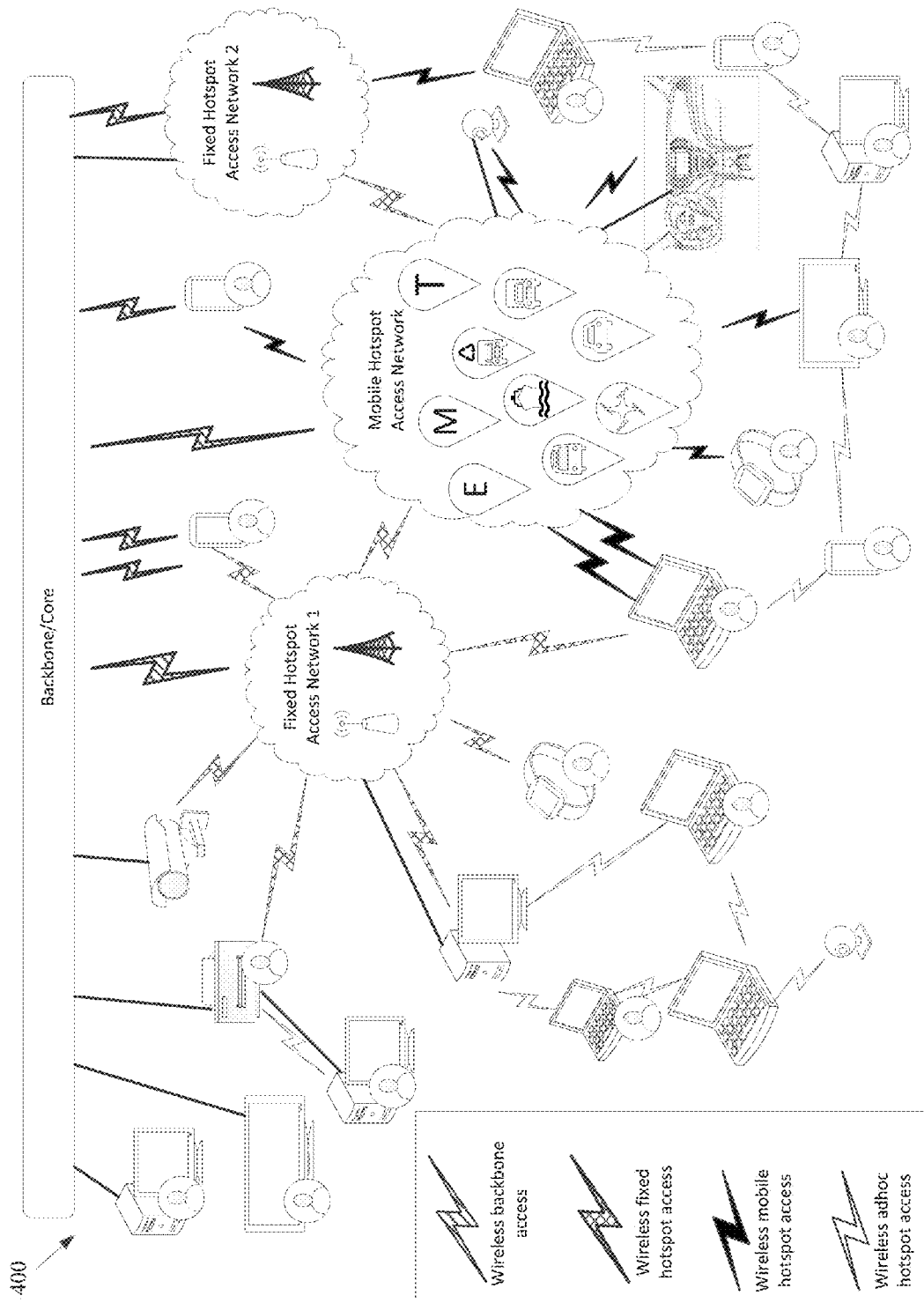
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
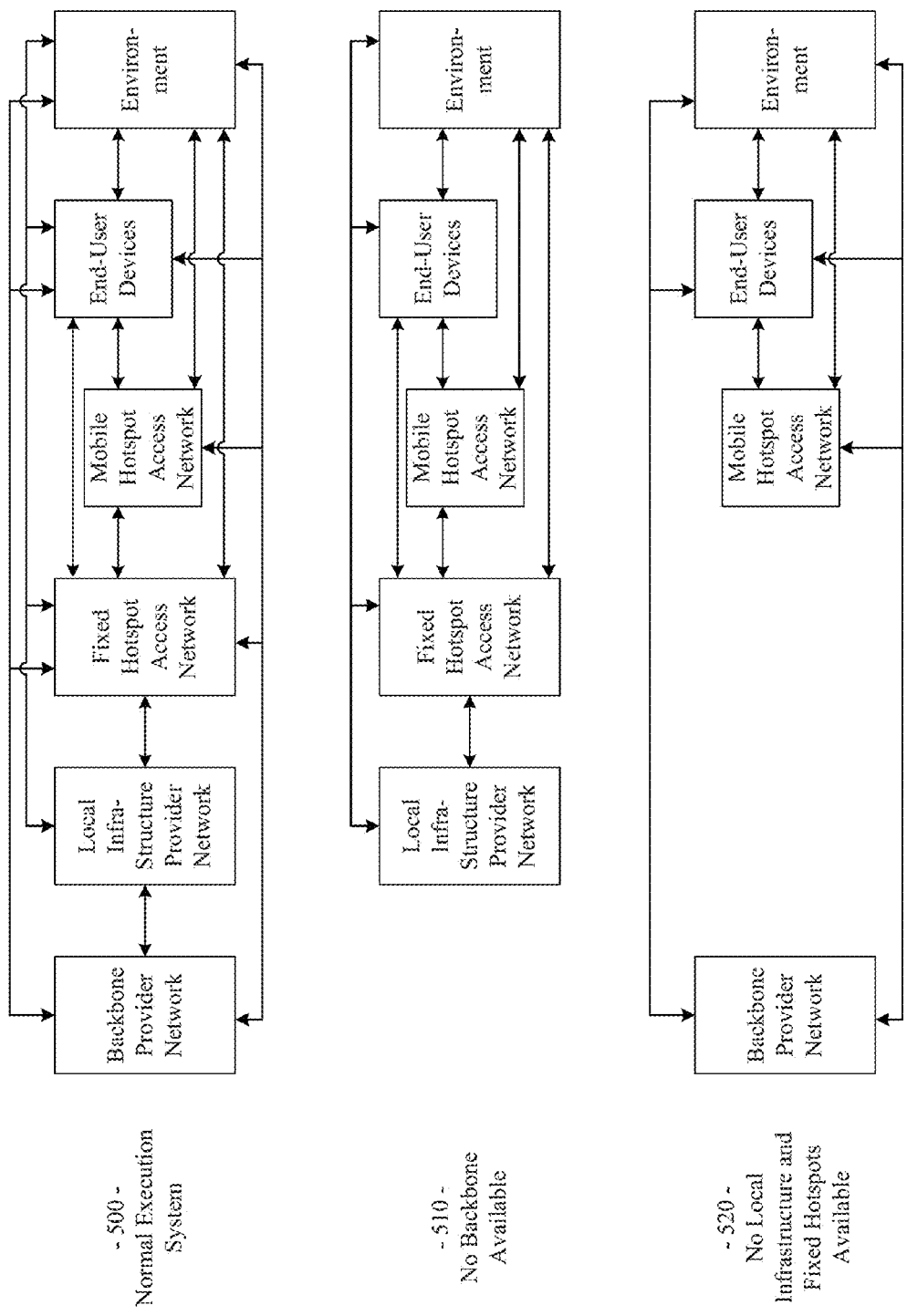
FIGS. 5A-5C show a plurality of network configurations illustrating the flexibility and/or and resiliency of a communication network, in accordance with various aspects of this disclosure.
Figure 5B:
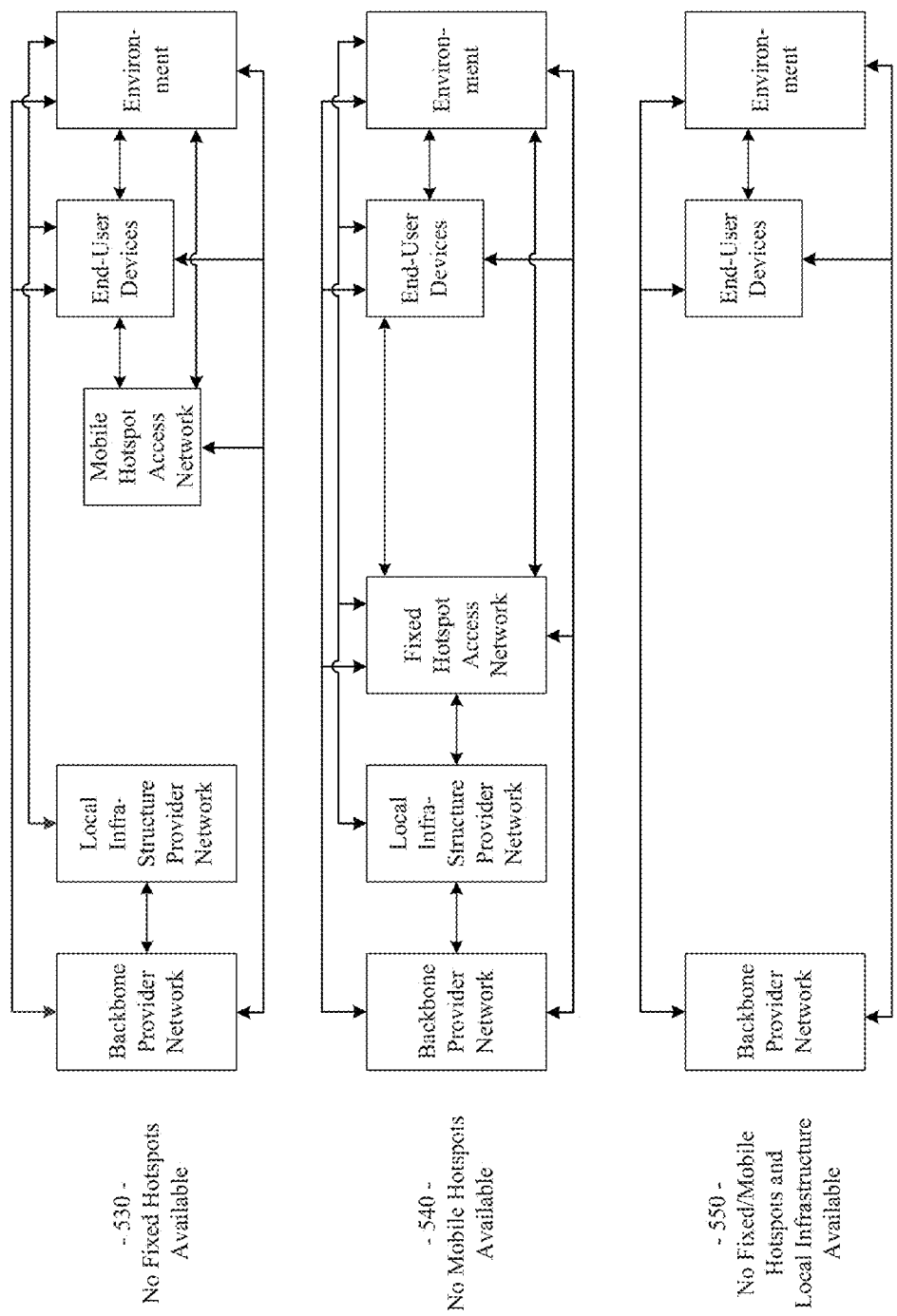
Figure 5C:
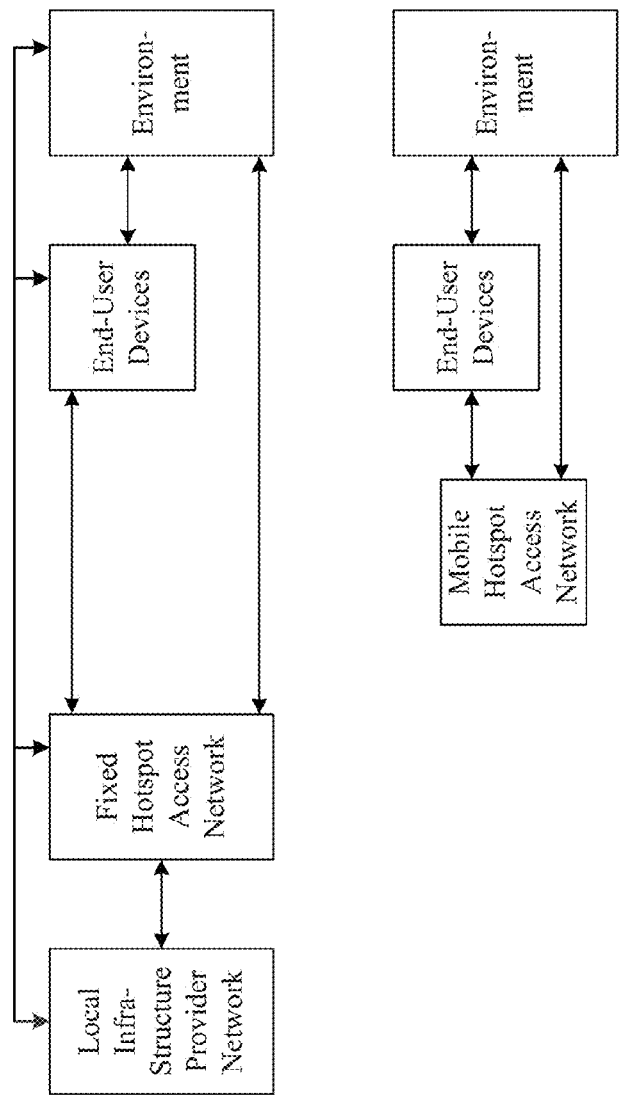

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode

500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
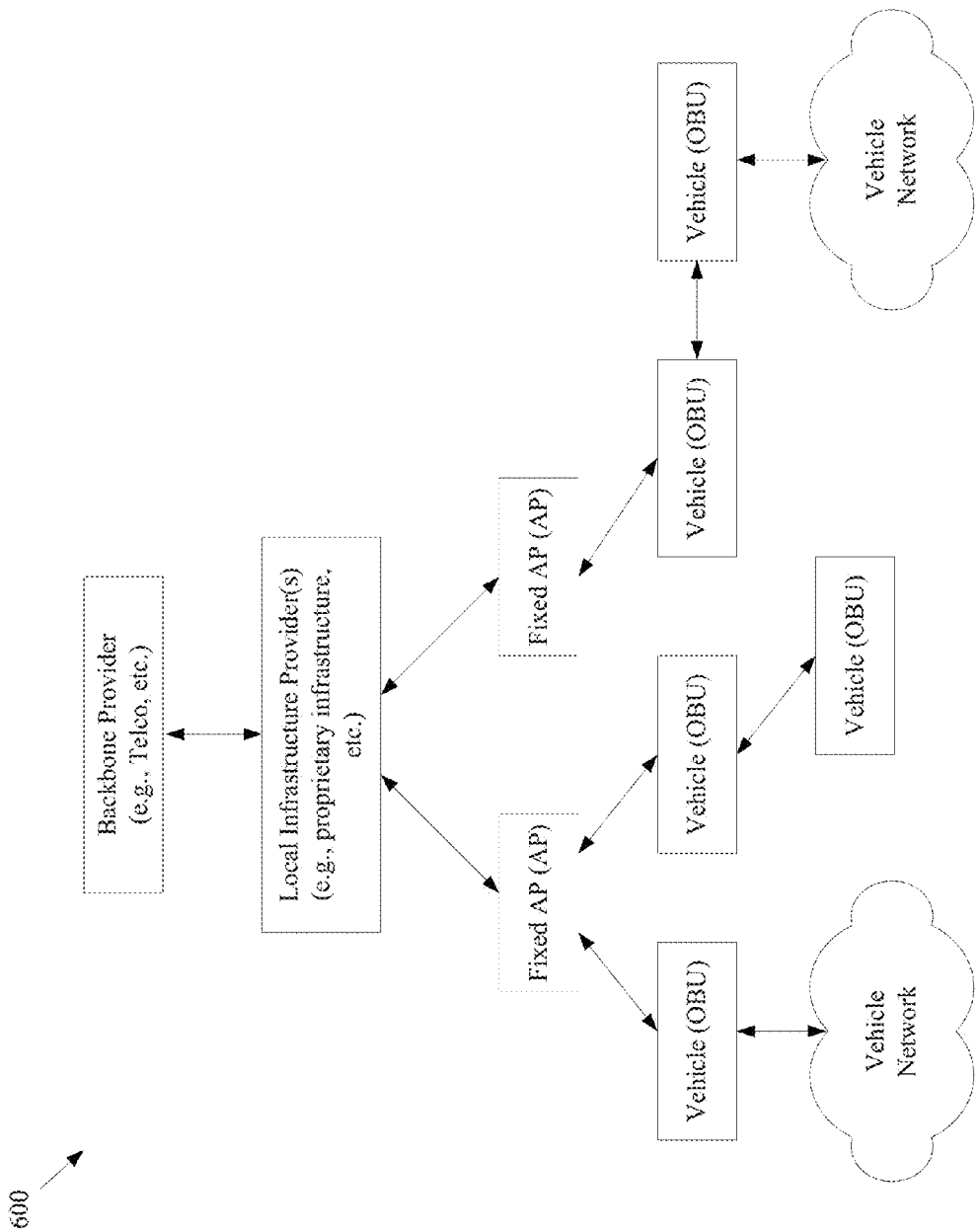
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In a dynamic network of moving nodes, for example comprising moving network access points, various types of information that are not typically known or effectively distributed among nodes may be utilized managing the network.

Various standards (e.g., IEEE 802.11 a/b/g/n, IEEE 802.11p or WAVE, etc.) have described frames to be exchanged within the network. For example, IEEE 802.11 a/b/g/n describes a relationship between a station node (STA) and the access point (AP) with which it is associated. For example, the AP periodically broadcasts Beacon frames containing information about the service it is providing. Stations within range to correctly receive the Beacon frames are then aware of the AP and its services. Also for example, IEEE 802.11p describes a similar mechanism for vehicular networks, where a provider broadcasts its services on the control channel (CCH), its information included in a broadcast frame called a WAVE service advertisement (WSA). While this information is generally beneficial for a protocol designed for vehicular networks, the provider is the only one broadcasting the information. Because of this one-way communication, the network (or various elements thereof) is not fully aware of its nodes. For example, nodes are not fully aware of other nodes (e.g., peer nodes, client nodes, etc.).

Various aspects of this disclosure remedy this deficiency, for example by providing a dynamic broadcast frame that may be transmitted by any or all of the nodes within a vehicular network. In accordance with various aspects of this disclosure, a fully configurable mechanism is deployed that allows nodes to share control-related information among them, where such shared information may then be used in a variety of applications (e.g., network management applications, etc.), depending on the context. Additionally, the broadcast level of the control information may be flexibly configured and adapted based on any of a variety of considerations (or metrics), for example location, time-to-live (TTL), type of node, etc. For example, the number of hops (or the extent to which the control information may be communicated) may be flexibly configured. The control information may, for example, be broadcast (or transmitted) bidirectionally between nodes (e.g., between mobile APs, between mobile APs and fixed APs, etc.). The communication of such information provides for context awareness throughout the network.

Various aspects of the present disclosure provide for internal and/or external utilization of the communicated information. For example, internally to the network or to a node, the information may be utilized for connection and/or configuration management, rate adaptation, routing, etc. Externally, for example, any of a variety of external applications may be able to access the information shared among the nodes. As discussed herein, for example, the information may be stored in the cloud, and APIs may be provided by a cloud server by which clients may access particular information.

As discussed herein, context awareness of each node may help to achieve fast and reliable management and/or communication within a vehicular network. For example, each node may be context-aware, for example each node having all relevant information to make the necessary decisions. Such information may, for example, comprise positioning (or localization) information (e.g., GPS information, etc.) so a node can make decisions based on the location of the node, locations of neighboring nodes, etc.

Various example systems and methods disclosed herein, for example, provide for the broadcast (or transmission) of local relevant information among all neighboring nodes within communication range (e.g., single-hop communication range or multi-hop communication range). Various aspects of this disclosure provide for the generation of frames (or messages) called Node Status Information (NSI) frames. Such frames may, for example, be communicated in a beacon message.

A table, which may be referred to herein as the NSI Table (NSIT), that comprises some or all of the received information from each neighbor (e.g., one-hop neighbor, two-hop neighbor, etc.) may be maintained and/or communicated to other nodes. The entity responsible for sending NSI frames periodically and for managing the NSIT may be referred to herein as the NSI management entity (NME). Various protocol information relevant for any or all nodes, such as routing and data rate control information, may also be exchanged.

In accordance with various aspects of this disclosure, a system or method may consider various factors when broadcasting frames, for example the location, channel load (CL) and time-to-live (TTL) information. Such operation may, for example, avoid or at least control channel congestion. In an example scenario in which a substantial amount of nodes are within a certain range of each other, an example system or method may evaluate the CL parameter to decide if the channel has a high occupancy, which in turn causes the NME to decrease the transmission rate of the NSI frames (e.g., number of frames per second). In another example implementation, for example in which an NSI frame can be transmitted through multi-hop, the TTL field may be utilized. In still another example implementation, the NME also provides for location-specific broadcasting, for example where a higher entity can specify the number and/or transmission rate of NSI frames that should be transmitted at a certain location.

In another example scenario, for example in accordance with an IEEE 802.11p implementation, all management frames are transmitted at CCH, and therefore all nodes should switch between CCH and service channel (SCH) in order to listen the management information. In accordance with various aspects of this disclosure, the management frames may be broadcast (e.g., transmitted) on any channel. Such operation may, for example, avoid the need to listen periodically to the CCH. In addition, a system or method in accordance with this disclosure may, for example, be implemented in the data link layer, for example providing for faster operation than other protocols, for example avoiding the overhead of communicating through higher layers to process the data.

Similarly, a system or method in accordance with various aspects of this disclosure may be utilized to perform the routing algorithm (or a portion thereof). For example, the NSI may comprise routing and/or protocol information, and implementation in the data link layer (layer 2) can be performed faster than implementation in the IP layer (layer 3) utilizing layer 3 frames. Similarly, a system or method in accordance with various aspects of this disclosure may also be utilized to perform the rate control algorithm (or a portion thereof). For example, the NSI may comprise applied data rate information. Various aspects of this disclosure may also enhance connection management operation, for example providing neighbor information to the connection manager to help decide whether it can or should connect to a neighbor within its range.

Various examples of NSI frame characteristics, the control of NSI frame content, the control of NSI frame transmission, NSI table management, NME operation, etc., are provided in PCT Application PCT/IB2016/051112, filed on Feb. 29, 2016, and titled "Method and System for Operating a Vehicular Data Network Based on a Layer-2 Periodic Frame Broadcast, in Particular a Routing Protocol," which is hereby incorporated herein by reference in its entirety.

Figure 7:
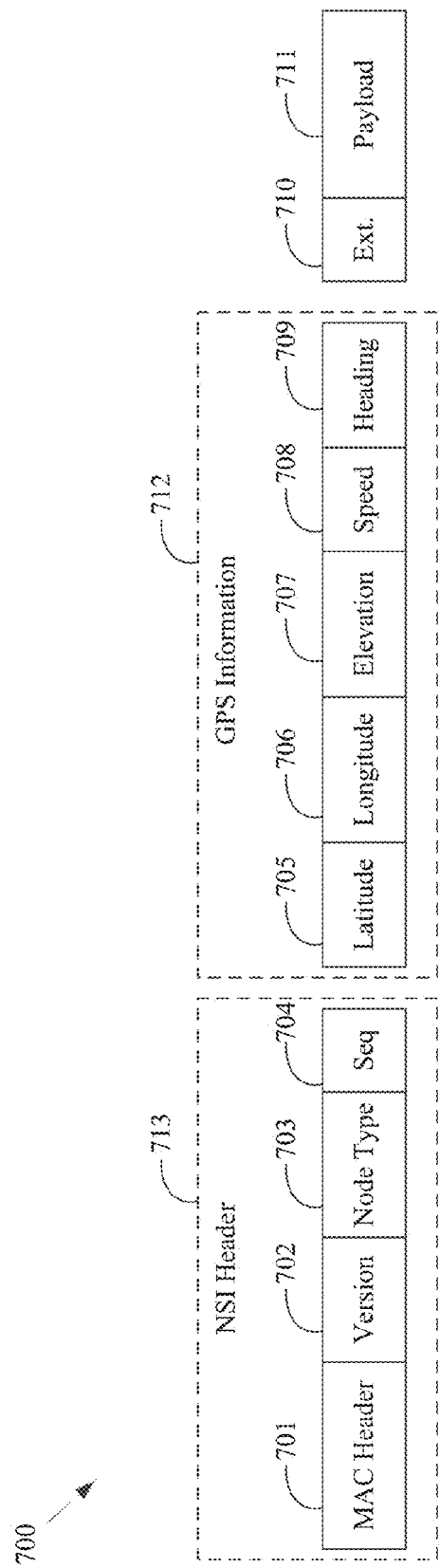
FIG. 7 shows a format of an example NSI frame, in accordance with various aspects of the present disclosure.

FIG. 7 shows a format of an example NSI frame 700. The example frame 700 comprises an NSI header 713 that comprises a MAC Header field 701, a Version field 702, a Node Type field 703, and a Sequence Number field 704. The Node Type field 703 may, for example, comprise a numerical representation indicating the type of node that sent the frame 700 (e.g., a Fixed AP or road-side unit (RSU), a Mobile AP or on-board unit (OBU), etc.). Such node type information may, for example, be utilized to determine whether the sender is a moving or mobile node.

The example frame 700 also comprises GPS Information 712. The GPS information 712 may, for example, comprise a Latitude field 705, a Longitude field 706, an Elevation field 707, a Speed field 708, and a Heading field 709. Other types of GPS information, general location information, trajectory information, orientation information, etc. may also be incorporated.

The example frame 700 may also comprise an Extra field 710, which may for example comprise a variable size field containing additional relevant information for the network. The example frame 700 may also comprise a general Payload field 711. In accordance with various aspects of this disclosure, though not shown, the example frame 700 may comprise any of a variety of fields, the selection of which is adaptable in real-time (e.g., based on present node context, anticipated node context, etc.). For example, the example frame 700 may comprise a Current Service Info field that includes information regarding services currently being provided (and/or utilized and/or sought) by the sending node. Also for example, the example frame 700 may comprise a Routing field that includes routing-related information (e.g., node ID information, node address information, end-point ID information, next hop ID information, routing protocol information, etc.). Additionally, for example, the example frame 700 may comprise a Channel Loading field that includes channel loading information (e.g., percentage or amount of communication bandwidth being utilized or available, number of nodes detected on the channel, etc.), a Data Rate Control field that includes data rate control information, a TTL field that includes time-to-live or hop count information, a Neighbor Count field that includes a count of the sending node's immediate neighbors (e.g., one-hop neighbors, etc.), etc. Further, for example, the example frame 700 may comprise a DTN field that includes any of a variety of types of delay-tolerant networking information (e.g., percentage of current traffic that is delay tolerant, buffer utilization and/or capacity, etc.). Still further for example, the example frame 700 may comprise a Client Count (or user count) field that includes information regarding a number of client devices, applications, users, etc. that are presently being serviced by the sending node (e.g., directly or indirectly through other nodes). For example, the example frame 700 may comprise a Client Detail (or user detail) field that includes detailed information regarding any or all clients of the sending node, for example including bandwidth utilization, type of applications being executed, etc.). Also for example, the example frame 700 may comprise a Neighbor Info field that includes information describing neighbor characteristics in detail (e.g., any or all of the example information discussed herein from the perspective of a neighbor), which may for example have been received in a beacon or other message from the neighbor. Note that such information may correspond to an immediate neighbor (e.g., a one-hop neighbor), a secondary neighbor (e.g., a two-hop neighbor), etc. Further for example, the example frame 700 may comprise a Command field that includes operational command or request information (e.g., a command or request originated by the sending node, a command or request originated by another node and being propagated by the sending node, etc.). Still further for example, the example frame 700 may comprise a Channel Quality field that includes channel quality information (e.g., signal-to-noise ratio (e.g., average or in detail with respect to each signal), noise level information, signal level information, error rate information, etc.). Also for example, the example frame 700 may have an Emergency Info field that includes information of an emergency condition in the vicinity of the node. In general, the example frame 700 (e.g., a Node Status Information frame, etc.) may comprise any or all of the example fields discussed herein. It should be understood that the scope of the present disclosure is not limited by characteristics of any particular field or combination thereof.

Formation and/or transmission of a beacon or other message, for example including an NSI frame (e.g., the example NSI frame 700 of FIG. 7, etc.), may comprise any of a variety of characteristics and/or be controlled in any of a variety of manners, non-limiting examples of which are provided herein. Notably, the fields of the NSI frame and/or the manner in which the NSI frame (e.g., a beacon, etc.) are transmitted are adaptable in response to real-time node context. An example message exchange sequence is provided at FIG. 8.

Figure 8:
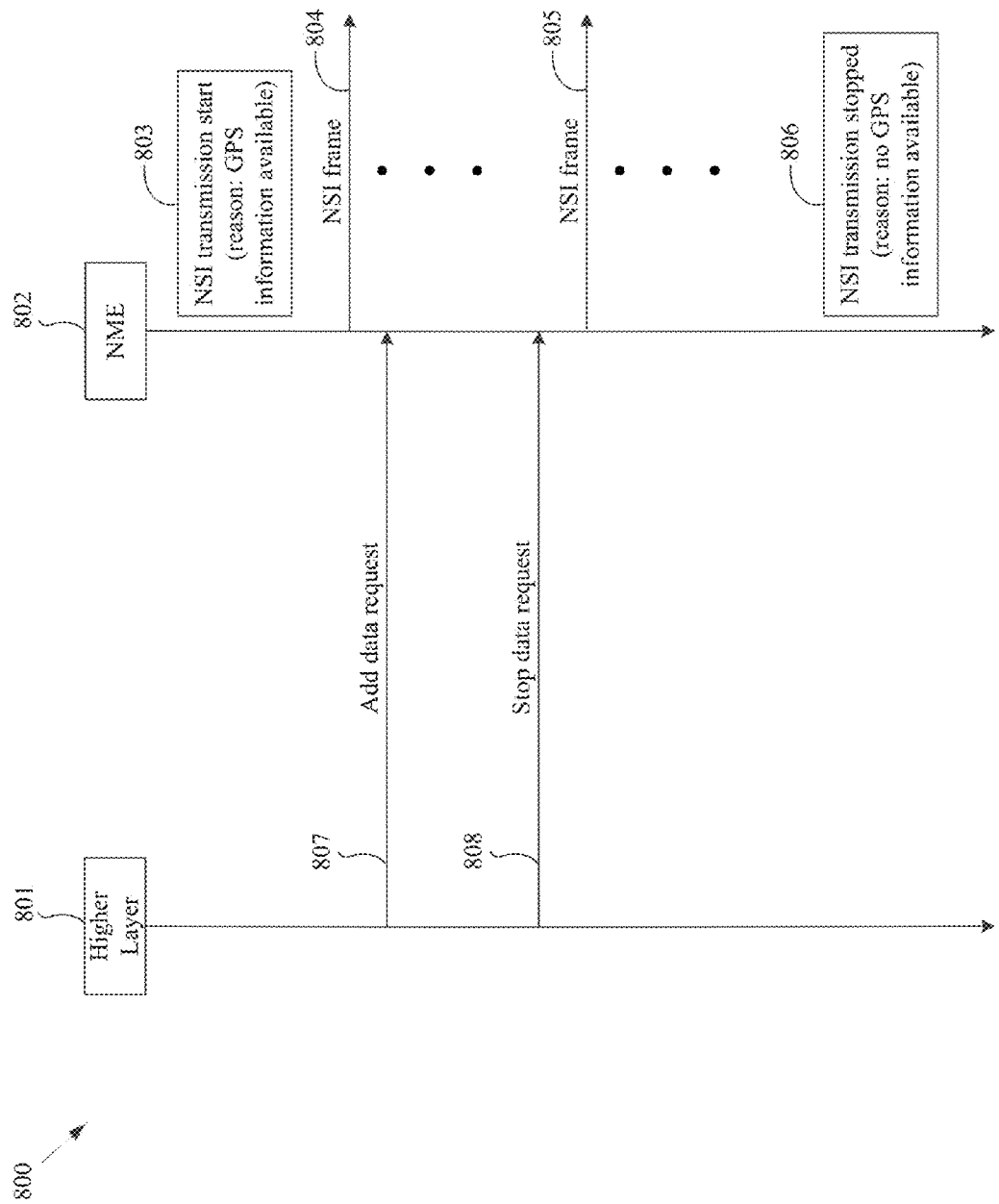
FIG. 8 shows an example message sequence chart, in accordance with various aspects of the present disclosure.

FIG. 8 shows an example message sequence chart 800, in accordance with various aspects of the present disclosure. For example, the chart shows a new data request from a Higher Layer entity 801 to an NME 802 of a node (e.g., a mobile AP, fixed AP, etc.).

In an example implementation, the NME 802 may periodically transmit NSI frames (e.g., frame 804, 805, etc.), for example in a beacon message, starting when GPS information (or motion information, etc.) is available 803 and ending when GPS information (or motion information, etc.) is not available 806. In the example scenario shown in FIG. 8, the Higher Layer entity 801 communicates an Add data request message 807 to the NME 802 requesting that particular data be included in NSI frames transmitted by the NME 802. The Higher Layer entity 801 may, for example, be of the same node as the NME 802, or may be part of a different node. At such point, the NSI frames transmitted by the NME 802 may comprise the requested data. Some time later, the Higher Layer 801 sends a Stop data request message 808 to the NME 802 notifying that the NME 802 may stop including the previously requested data in the NSI frames. The NSI frames subsequently transmitted by the NME 802 may then be transmitted without the previously-added data.

As shown herein, various aspects of the present disclosure provide bi-directional broadcast management communication between provider entities (e.g., service provider entities) and/or between provider entities and users (or clients) within a vehicular network. Various aspects of the present disclosure provide for the two-way communication of relevant information about a node with other nodes within a range or area. For example, important information (e.g., context information) may be gathered and communicated, which may then feed both internal and external applications (e.g., through cloud APIs, etc.). Various aspects of the present disclosure provide a context awareness that may be utilized by mobility systems, configuration management systems, connectivity systems, routing systems, vehicle route planning systems, etc. For example, in an example implementation, various connectivity and/or routing decisions may be made autonomously at the mobile and/or fixed AP level, rather than at the higher levels. Also as seen herein, APIs may be provided (e.g., by which cloud applications may access context information stored in the cloud, by which cloud applications may request particular types of information to be gathered and stored, etc.).

In an example implementation, the information gathered from neighboring nodes may be provided to peer nodes, to higher level nodes, to system and external apps as a table and/or database, to other systems or networks through an API, etc. For system applications, the information may, for example, be communicated through an internal request using a local API. In an example implementation, for external applications, access to the information may be allowed based on the client needs. Critical information may for example be protected and inaccessible or accessible through an authentication mechanism after subscription to that information (e.g., using a security token, etc.). The critical information accessibility may, for example, be mutually determined by the client and the service provider. An example system for collecting, storing, and/or providing the information is provided in in PCT Application PCT/IB2016/051112, filed on Feb. 29, 2016, and titled "Method and System for Operating a Vehicular Data Network Based on a Layer-2 Periodic Frame Broadcast, in Particular a Routing Protocol," which is hereby incorporated herein by reference in its entirety.

As mentioned herein, a system and/or method implemented in accordance with various aspects of the present disclosure may flexibly adapt a message (e.g., a beacon message) to include any of a variety of combinations of information fields. A non-limiting example of such operation is shown at FIG. 9.

Figure 9:
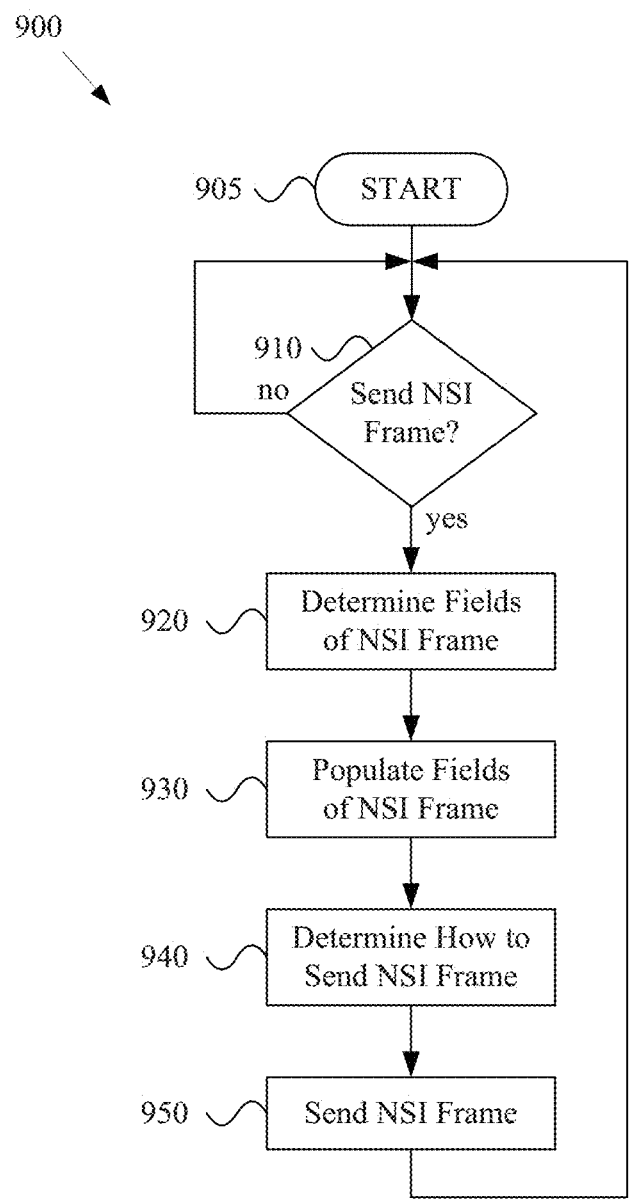
FIG. 9 shows a flow diagram of an example method of managing the transmission of beacon messages, in accordance with various aspects of the present disclosure.

In particular, FIG. 9 shows a flow diagram of an example method 900 of managing the transmission of beacon messages, in accordance with various aspects of the present disclosure. The example method 900 may, for example, share any or all characteristics with the other example methods, networks, and/or network components 100, 200, 300, 400, 500-570, 600, 700, 800, 1000, 1100, and 1200, discussed herein. For example, any or all functions discussed with regard to the example method 900 may be implemented by one or more of the network nodes discussed herein. For example, the example method 900, or any portion thereof, may be implemented by one or more modules (e.g., an NSI Management Entity) of the example Network Node 1200 (e.g., Mobile AP, Fixed AP, etc.) of FIG. 12.

The example method 900 begins executing at block 905. The example method 900 may begin executing in response to any of a variety of causes or conditions, non-limiting examples of which are presented herein.

For example, the example method 900 may generally continually execute, for example in response to powering up, rebooting, or resetting one or more nodes of the network. Also for example, the example method 900 may begin executing in response to a user command (e.g., an end-user request, a command from network management personnel, a service provider request, a fleet manager request, etc.). Additionally for example, the example method 900 may begin executing in response to one or more metric measurements performed automatically by the system (e.g., a vehicle context measurement, node or path throughput measurements, channel quality measurement, error rate measurement, neighbor node assessment, added or dropped link, user count or loading measurements, node-generated error or warning messages, information received from a public service node (e.g., public service announcements, warning and alerts, etc.), command originating at a cloud source or server, etc. Also for example, the example method 900 may be initiated periodically (e.g., at timed intervals, consistent and/or inconsistent timed intervals, etc.). In general, the example method 900 may execute in response to any of a variety of causes or conditions. Accordingly, the scope of this disclosure should not be limited by characteristics of any particular initiating cause or condition.

The example method 900 may, at block 910, comprise determining whether to send an NSI frame (e.g., whether to send a beacon message or other message comprising an NSI frame, etc.). Block 910 may comprise determining whether to send the NSI frame in any of a variety of manners, non-limiting examples of which are provided herein.

For example, block 910 may comprise determining whether to send an NSI frame based, at least in part, on whether particular information (or a signal associated therewith) is available. For example, as shown in the example message sequence chart of FIG. 8, the node (e.g., an NME thereof) may refrain from sending the NSI frame when GPS information (or other location information, motion information, time synchronization information, etc.) is not available.

For example, block 910 may comprise determining whether to send an NSI frame based, at least in part, on time. For example, there may be a time deadline associated with the transmission. Also for example, there may be a mandate or goal for the transmission of one or a particular multiple number of NSI frames within a particular time period. Additionally for example, the NSI frame transmission may be periodic with a static or dynamic (e.g., adaptable) period. Note that such periodicity may be strict or may be based on a goal (e.g., subject to channel availability, etc.). In an example implementation, a node (e.g., an NME thereof) implementing the example method 900 may broadcast beacons comprising an NSI frame at a rate of 10/sec, 5/sec, 20/sec, etc. Such rate may be adaptable.

Also for example, block 910 may comprise determining whether to send an NSI frame based, at least in part, on a number of NSI frames that have been sent and/or on a target number of NSI frames to be sent. For example, in an example scenario in which a beacon strategy is to transmit a target number of frames, block 910 may comprise determining to send an NSI frame when the target number has not yet been reached and determining to refrain from sending an NSI frame when the target number has been reached.

Additionally for example, block 910 may comprise determining whether to send an NSI frame based, at least in part, on location (e.g., based on location of the node sending the NSI frame, based on the location of other nodes, etc.). For example, in an example scenario in which the node is in a region infamous for channel congestion, block 910 may comprise determining not to send the NSI frame or determining to defer sending the NSI frame (e.g., to help alleviate actual or anticipated channel congestion, etc.). Also for example, in an example scenario in which there are no other nodes within range of the node, block 910 may comprise determining not to send the NSI frame (e.g., to conserve power, etc.) or to defer sending the NSI frame. Additionally for example, in an example scenario in which the system manager determines that nodes in a particular region have outdated or inadequate context information, block 910 may comprise determining to send an NSI frame (e.g., to ensure that other nodes in that particular region receive updated context information from the node).

Further for example, block 910 may comprise determining whether to send an NSI frame based, at least in part, on channel load (e.g., on number of nodes using the channel, number of users or clients using the channel, amount of data traffic on the channel, communication bandwidth percentage utilization, etc.). For example, in an example scenario in which a channel is lightly loaded, block 910 may comprise determining to send the NSI frame. Also for example, in an example scenario in which the data traffic on the channel is nearing maximum capacity, block 910 may comprise determining to not send the NSI frame or to defer sending the NSI frame.

Still further for example, block 910 may comprise determining whether to send an NSI frame based, at least in part, on present channel conditions (e.g., RF environment conditions, signal-to-noise ratio, noise floor level, detected interference on the channel, etc.). For example, in an example scenario in which the noise level on the channel is detected to be above a threshold amount, block 910 may comprise determining not to send or defer sending the NSI frame (e.g., to alleviate, or at least to not add to, noisy conditions on the channel, etc.). Also for example, in an example scenario in which the channel is relatively noise free, block 910 may comprise determining to send the NSI frame.

Also for example, block 910 may comprise determining whether to send an NSI frame based, at least in part, on request or command messages received. Such request or command messages may, for example, originate at another node (e.g., a peer node, an upstream node, a downstream node, a network controller, a cloud server, etc.). Also for example, such request or command messages may originate at another module or entity of the node (e.g., an application, routing control module, connectivity control module, power control module, failover recovery module, etc.). In an example scenario, block 910 may comprise determining to send an NSI frame based on a command from a network controller to send NSI frames, to send an NSI frame with particular information, etc. In another example scenario, block 910 may comprise determining to refrain from sending an NSI frame if requested not to do so.

Additionally for example, block 910 may comprise determining whether to send an NSI frame based, at least in part, on hop count. For example, in an example scenario in which the node has received an NSI frame (or other information) from another node and in which such information is associated with a hop count, block 910 may comprise determining whether to transmit the received information in an NSI frame based on whether the hop count (or time to live) limit associated with the received NSI frame has been reached. For example, if the received NSI frame has a specified maximum hop count of three, and the receipt of the NSI frame is the third hop, then block 910 may comprise determining to refrain from transmitting the NSI frame.

Further for example, block 910 may comprise determining whether to send an NSI frame based, at least in part, on operating conditions of the node. For example, block 910 may comprise determining to refrain from sending an NSI frame or defer sending the NSI frame if a finite power supply for the node is running low (e.g., below a threshold, etc.). Also for example, block 910 may comprise determining to refrain from sending an NSI frame or to defer sending the NSI frame if a present error rate is too high. Additionally for example, block 910 may comprise determining to refrain from sending an NSI frame or defer sending the NSI frame if an operating temperature of the node is higher than desired (e.g., to reduce heat generation). Further for example, block 910 may comprise determining to send an NSI frame that includes a temperature field if the operating temperature is too high (e.g., to notify other nodes of a potential overheating or failure condition occurring at the node, etc.).

Still further for example, block 910 may comprise determining whether to send an NSI frame based, at least in part, on priority. For example, in an example scenario in which the NSI frame includes one or more fields having high-priority information, block 910 may comprise determining to send the NSI frame, for example even when other factors being considered weigh against such sending.

Also for example, block 910 may comprise operating in a default manner (e.g., always transmitting NSI frames, never transmitting NSI frames, transmitting NSI frames periodically at a default period, etc.), unless other factors being considered warrant operating in a manner different from the default manner.

Though each of the example decision factors was presented individually, it should be understood that block 910 may comprise considering any or all of such example factors (and others) in aggregate, for example serially and/or in parallel. For example, any or all of such factors may be considered as components (e.g., equal or weighted components) of a cost function. Also for example, any or all of such factors may be formed into a decision tree in which consideration of a factor (or plurality thereof) directs consideration of a next factor (or plurality thereof) until a leaf of the tree is reached that includes the NSI frame sending decision.

In general, block 910 may comprise determining whether to send an NSI frame (e.g., whether to send a beacon message or other message comprising an NSI frame, etc.). Accordingly, the scope of this disclosure should not be limited by characteristics of any particular manner of performing such determining.

The example method 900 may, at block 920, comprise determining the fields of the NSI frame (e.g., what fields of information to include, what information to place in such fields, etc.). Block 920 may comprise determining the fields of the NSI frame in any of a variety of manners, non-limiting examples of which are provided herein.

For example, block 920 may comprise determining the fields of the NSI frame based, at least in part, on any or all of the context information examples provided herein (e.g., with regard to block 910). Note that in an example implementation, various fields of the NSI frame may be standard (or required) and various fields may be optional.

For example, block 920 may comprise determining the fields of the NSI frame based, at least in part, on whether particular information (or a signal associated therewith) is available. For example, as shown in the example message sequence chart of FIG. 8, when the node (e.g., an NME thereof) has access to GPS information (or other location information, motion information, etc.) block 920 may comprise inserting a field for the GPS information in the NSI frame. Note that such information (or any information discussed herein) may be mandatory.

Also for example, block 920 may comprise determining the fields of the NSI frame based, at least in part, on time. For example, during particular time intervals, particular fields may be inserted into the NSI frame. For example, during a traditionally busy time period for the network, block 920 may comprise inserting fields including information that is important for load balancing, ensuring that the necessary resources are being allocated to adequately cover the regions, etc. Also for example, during a traditionally busy time period for the network, block 920 may comprise removing all but necessary fields from the NSI frame, for example to minimize bandwidth utilization for NSI frame transmissions. Additionally for example, during a traditionally non-busy time period, block 920 may comprise inserting fields into the NSI frame associated with activities (e.g., network preventative maintenance activities, etc.) that generally occur during non-busy time periods.

Also for example, block 920 may comprise determining the fields of the NSI frame based, at least in part, on number of NSI frames that have been sent and/or on a target number of NSI frames to be sent. For example, in an example scenario in which a beacon strategy is to transmit a target number of frames, block 920 may comprise determining to insert a field indicating the sequence number of the beacon and/or the target number.

Additionally for example, block 920 may comprise determining the fields of the NSI frame based, at least in part, on location (e.g., based on location of the node sending the NSI frame, based on the location of other nodes, etc.). For example, in an example scenario in which the node is in a region infamous for channel congestion, block 920 may comprise inserting one or more fields in the NSI frame that concern channel congestion (e.g., channel congestion measurements, congestion trends, traffic off-loading possibilities etc.). Also for example, in an example scenario in which there are no other nodes within range of the node, block 920 may comprise determining to send an NSI frame having only a bare minimum amount of information (e.g., to save transmission power). Additionally for example, in an example scenario in which the system manager determines that nodes in a particular region have outdated or inadequate context information, block 920 may comprise determining to send an NSI frame with a maximum amount of current context information (e.g., to ensure that other nodes in that particular region receive updated context information from the node). Additionally for example, in an example scenario in which a location or region has been associated with an emergency situation, block 920 may comprise determining to send an NSI frame with one or more fields that indicate the node's present capabilities to effectively perform emergency communications (e.g., available bandwidth for real-time communication, redundant communication pathway availability, expected time in or near the emergency region, availability to linger in the emergency region to provide services therein, etc.).

Further for example, block 920 may comprise determining the fields of the NSI frame based, at least in part, on channel load (e.g., on number of nodes using the channel, number of users or clients using the channel, amount of data traffic on the channel, etc.). For example, in an example scenario in which a channel is lightly loaded, block 920 may comprise inserting a field into the NSI frame that includes information indicating the amount of available bandwidth. Also for example, in an example scenario in which the data traffic on the channel is nearing maximum capacity, block 920 may comprise determining to insert a field into the NSI frame that indicates information indicating the data traffic condition. Additionally for example, in an example scenario in which data traffic on the channel is relatively light, block 920 may comprise inserting low-priority fields (e.g., experimental frames, etc.) into the NSI frame. Further for example, in an example scenario in which data traffic on the channel is relatively high, block 920 may comprise inserting only mandatory and relatively high-priority fields into the NSI frame.

Still further for example, block 920 may comprise determining the fields of the NSI frame based, at least in part, on present channel conditions (e.g., RF environment conditions, signal-to-noise ratio, noise floor level, detected interference on the channel, etc.). For example, in an example scenario in which the noise level on the channel is detected to be above a threshold amount, block 920 may comprise determining to insert a field into the NSI frame that indicates the above-threshold noise condition. Also for example, in such an example scenario, block 920 may comprise only inserting mandatory and high-priority fields into the NSI frame.

Also for example, block 920 may comprise determining the fields of the NSI frame based, at least in part, on request or command messages received. Such request or command messages may, for example, originate at another node (e.g., a peer node, an upstream node, a downstream node, a network controller, a cloud server, etc.). Also for example, such request or command messages may originate at another module or entity of the node (e.g., an application, routing control module, connectivity control module, power control module, failover recovery module, etc.). In an example scenario, block 920 may comprise determining to insert a field into an NSI frame based on a command from a network controller to include the field in the NSI frames, to populate the field with particular information, etc. In another example scenario, block 920 may comprise removing a field from the NSI frame when requested or commanded to do so.

Additionally for example, block 920 may comprise determining the fields of the NSI frame based, at least in part, on hop count. For example, in an example scenario in which the node has received an NSI frame (or other information) from another node and in which such information is associated with a hop count, block 920 may comprise including a field in the NSI frame that provides an updated current hop count and/or hop count (or time to live) limit associated with the NSI frame.

Further for example, block 920 may comprise determining the fields of the NSI frame based, at least in part, on operating conditions of the node. For example, block 920 may comprise determining to include one or more fields in the NSI frame that indicate various operation conditions of the node. The determination to include such fields may, for example, be based on whether an operating condition is above or below a threshold. For example, in an example scenario in which node temperature exceeds a threshold, block 920 may comprise determining to insert a node temperature field into the NSI frame. Also for example, in an example scenario in which the node is experiencing a substantial amount of physical trauma, block 920 may comprise determining to insert a shock/vibration field into the NSI frame. Additionally for example, in an example scenario in which the node is experience a frame error rate above a particular threshold amount, block 920 may comprise determining to insert an error rate field into the NSI frame. Such operation may, for example, be performed in response to any detected abnormal or unexpected operation condition (e.g., low power, unexpected temperature, unexpected shock, unexpected utilization amount, unexpected location or movement, etc.).

Still further for example, block 920 may comprise determining the fields of the NSI frame based, at least in part, on priority. For example, in an example scenario in which the node has high-priority information (e.g., context information, etc.) to disseminate to other nodes, block 920 may comprise inserting one or more fields into the NSI frame that include such high-priority information. Also for example, in an example scenario in which the node has low-priority information to disseminate to other nodes, block 920 may comprise refraining from including fields for such low-priority information in the NSI frame, for example unless other factors discussed herein (e.g., channel loading conditions, time conditions, location conditions, etc.) indicate that including fields for low-priority information is appropriate.

Also for example, block 920 may comprise operating in a default manner (e.g., inserting a default set of fields into the NSI frame, etc.), unless other factors being considered warrant operating in a manner different from the default manner.

Though each of the example decision factors was presented individually, it should be understood that block 920 may comprise considering any or all of such example factors (and others) in aggregate, for example serially and/or in parallel. For example, any or all of such factors may be considered as components (e.g., equal or weighted components) of one or more cost functions. Also for example, any or all of such factors may be formed into one or more decision trees in which consideration of a factor (or plurality thereof) directs consideration of a next factor (or plurality thereof) until a leaf of the tree is reached that includes the NSI field determination decision(s).

In general, block 920 may comprise determining the fields of the NSI frame (e.g., what fields of information to include, what information to place in such fields, etc.). Accordingly, the scope of this disclosure should not be limited by characteristics of any particular manner of performing such determining.

The example method 900 may, at block 930, comprise populating the fields determined at block 920 with the appropriate information. The example method 900 may then, at block 940, comprise determining how to send the NSI frame.

For example, as discussed herein, an NSI frame (e.g., a beacon) may be communicated in a variety of manners, for example via a plurality of channels. For example, the NSI frame may be communicated via a control channel, via a service channel, via any one or more of a variety of communication pathways provided by the network, etc. Block 940 may, for example, comprise selecting the manner in which to communicate the NSI frame (e.g., channel selection, etc.). Such manner may, for example, depend on the type of transmission selected for the NSI frame.

Also, though generally an NSI frame may be broadcast (e.g., as a beacon message, etc.), the scope of the present disclosure is not limited thereto. For example, block 940 may comprise determining to multi-cast (e.g., to members of a group of nodes, nodes associated with a particular fleet, etc.) the NSI frame. Also for example, block 940 may comprise unicasting the NSI frame. For example, in an example scenario, every other NSI frame may be broadcast and every other NSI frame may be multi-cast (e.g., to a fleet, etc.).

The example method 900 may, at block 950, comprise sending the NSI frame (e.g., as a beacon, etc.). After sending the NSI frame, execution flow of the example method 900 returns to decision block 910.

In accordance with various aspects of this disclosure, a node may receive an NSI frame (e.g., a beacon, etc.) from another node. The node may then process the information in the received NSI frame and/or transmit the received NSI frame (e.g., propagating the received NSI frame to other nodes, for example in a multi-hop manner). An example of such operation is provided in FIG. 10.

Figure 10:
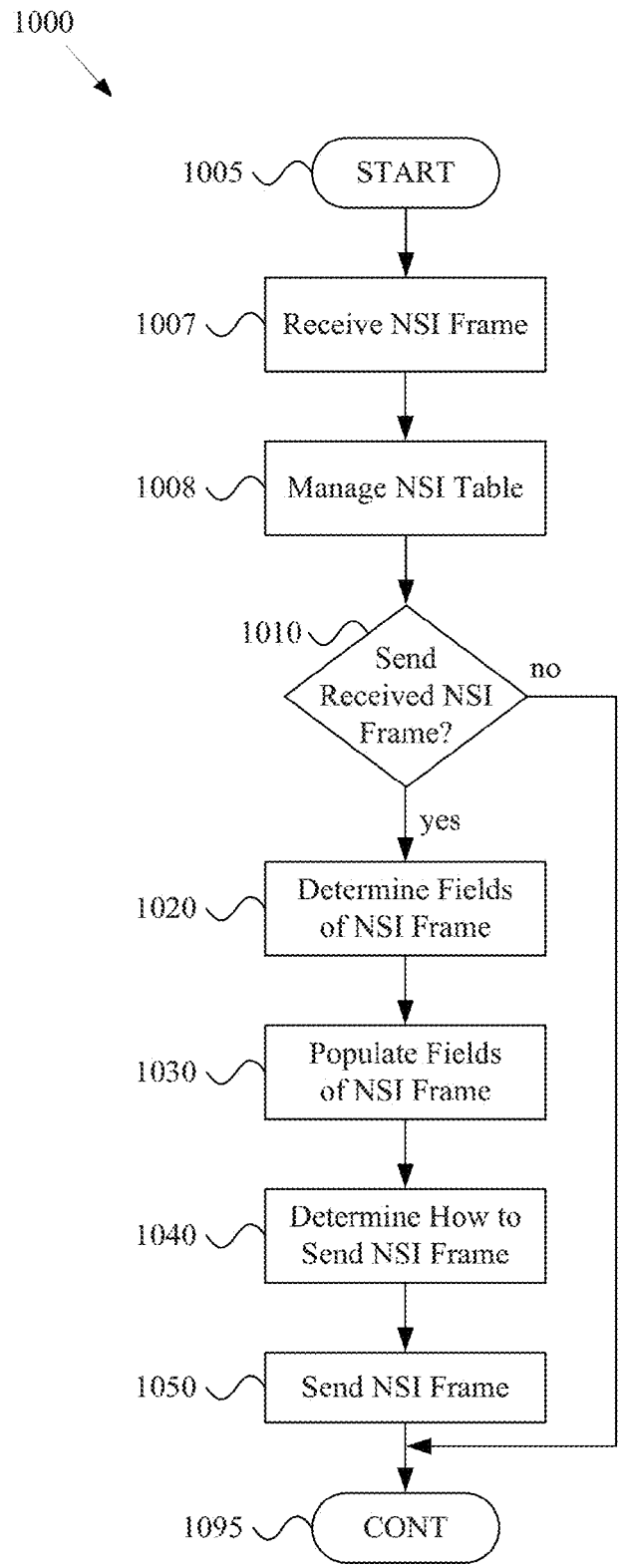
FIG. 10 shows a flow diagram of an example method of managing the transmission of beacon messages, in accordance with various aspects of the present disclosure.

In particular, FIG. 10 shows a flow diagram of an example method 1000 of managing the transmission of beacon messages, in accordance with various aspects of the present disclosure. The example method 1000 may, for example, share any or all characteristics with the other example methods, networks, and/or network components 100, 200, 300, 400, 500-570, 600, 700, 800, 900, 1100, and 1200, discussed herein. For example, any or all functions discussed with regard to the example method 1000 may be implemented by one or more of the network nodes discussed herein. For example, the example method 1000, or any portion thereof, may be implemented by one or more modules (e.g., an NSI Management Entity) of the example Network Node 1200 (e.g., Mobile AP, Fixed AP, etc.) of FIG. 12.

The example method 1000 begins executing at block 1005. The example method 1000 may begin executing in response to any of a variety of causes or conditions, non-limiting examples of which are presented herein. Block 1005 may, for example, share any or all characteristics with block 905 of the example method 900 of FIG. 9.

The example method 1000 may, at block 1007, comprise receiving an NSI frame transmitted by another node. Block 1007 may comprise receiving the NSI frame in any of a variety of manners.

The example method 1000 may, at block 1008, comprise managing an NSI Table (NSIT), for example a table that comprises some or all of the received information from each neighbor (e.g., one-hop neighbor, two-hop neighbor, etc.). Various examples of an NSIT are provided in PCT Application PCT/IB2016/051112, filed on Feb. 29, 2016, and titled "Method and System for Operating a Vehicular Data Network Based on a Layer-2 Periodic Frame Broadcast, in Particular a Routing Protocol," which is hereby incorporated herein by reference in its entirety.

Block 1008 may, for example, comprise removing stale nodes from the NSIT, for example when an NSI frame (e.g., beacon, etc.) or other message from a node has not been successfully received for at least a threshold amount of time. Also for example, block 1008 may comprise adding new nodes to the NSIT, for example when an NSI frame (e.g., beacon, etc.) or other message is received from a node (e.g., directly and/or indirectly via a multi-hop communication) that is not in the NSIT. Block 1008 may, for example, comprise updating information for a neighbor node in the NSIT based on information in the NSI frame received at block 1007.

The example method 1000 may, at block 1010, comprise determining whether to send (or transmit) the received NSI frame (e.g., a beacon message, etc.). Block 1010 may comprise determining whether to send the received NSI frame in any of a variety of manners, non-limiting examples of which are provided herein. For example, block 1010 may share any or all characteristics with block 910 of the example method 900 of FIG. 9.

Block 1010 may, for example, comprise analyzing time-to-live (TTL) and/or hop count information (e.g., of the NSI frame) to determine whether to transmit the received NSI frame. For example, in an example scenario in which the received NSI frame has only hopped once, and in which the received NSI frame has a hop limit of two hops (e.g., as indicated in the NSI frame), block 1010 may determine to send the received NSI frame. Also for example, in an example scenario in which the received NSI frame has hopped three times (e.g., as indicated in the NSI frame), and in which the received NSI frame has a hop limit of three (e.g., as indicated in the NSI frame), block 1010 may determine to refrain from transmitting the received NSI frame.

If block 1010 determines to send the received NSI frame, then block 1010 directs execution flow of the example method 1000 to block 1020. If block 1010 determines to refrain from sending the received NSI frame, then block 1010 directs execution flow of the example method 1000 to block 1095 for continued execution.

In general, block 1010 may comprise determining whether to transmit a received NSI frame, and directing execution flow of the example method 1000. Accordingly, the scope of this disclosure should not be limited by characteristics of any particular manner of performing such determining.

The example method 1000 may, at block 1020, comprise determining the fields of the NSI frame (e.g., what fields of information to include, what information to place in such fields, etc.). Block 1020 may comprise determining the fields of the NSI frame in any of a variety of manners, non-limiting examples of which are provided herein. Block 1020 may, for example, share any or all characteristics with block 920 of the example method 900 of FIG. 9.

For example, block 1020 may comprise determining to incorporate any or all of the same fields of the received NSI frame. Also for example, block 1020 may comprise adding any or all of the example fields discussed herein (e.g., with regard to block 920, etc.). Further for example, block 1020 may comprise determining to transmit the received NSI frame with exactly the same fields as included in the received NSI frame (e.g., with some information, for example hop count, modified).

The example method 1000 may, at block 1030, comprise populating the fields determined at block 1020 with the appropriate information. The example method 1000 may then, at block 1040, comprise determining how to send the NSI frame. Blocks 1030 and 1040 may, for example, share any or all characteristics with blocks 930 and 940 of the example method 900 of FIG. 9.

The example method 1000 may, at block 1050, comprise sending the NSI frame. After sending the NSI frame, the execution of the example method 1000 flows to block 1095 for continued execution.

The example method 1000 may, at block 1095, comprise continuing execution. Block 1095 may, for example, comprise directing execution flow of the example method 1000 to any previous block (or portion thereof) of the example method 1000. Block 1095 may also, for example, comprise directing execution flow of the example method 1000 to any other method discussed herein (or any block or portion thereof).

As discussed herein, various aspects of this disclosure comprise determining the general strategy utilized for beacon (e.g., NSI frame, etc.) transmission. Such strategy may, for example, comprise the contents of the beacon and the manner in which such beacons are transmitted (e.g., channel, periodicity, numbers, transmission deferrals, beacon triggers, beacon inhibitors, etc.). Various example aspects of such operation have been presented herein (e.g., with regard to FIGS. 1-10, etc.). Another example of such operation is provided in FIG. 11.

Figure 11:
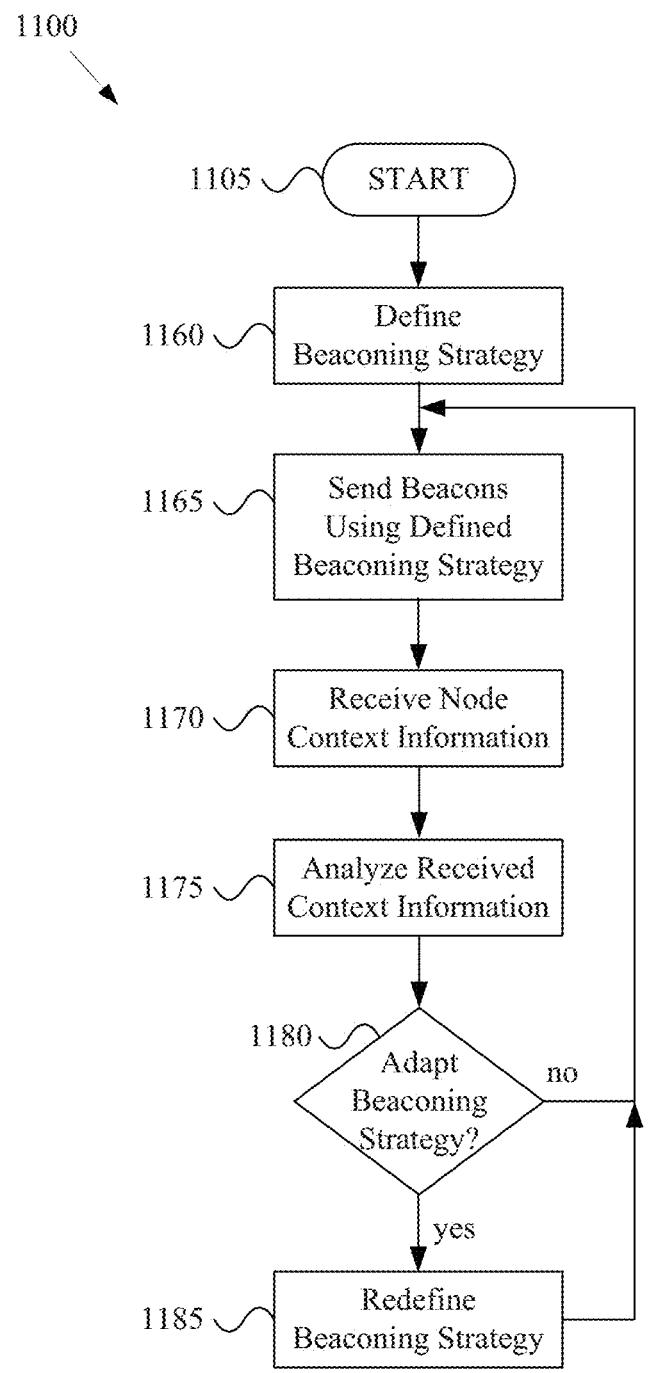
FIG. 11 shows a flow diagram of an example method of managing the transmission of beacon messages, in accordance with various aspects of the present disclosure.

In particular, FIG. 11 shows a flow diagram of an example method 1100 of managing the transmission of beacon messages, in accordance with various aspects of the present disclosure. The example method 1100 may, for example, share any or all characteristics with the other example methods, networks, and/or network components 100, 200, 300, 400, 500-570, 600, 700, 800, 900, 1000, and 1200, discussed herein. For example, any or all functions discussed with regard to the example method 1100 may be implemented by one or more of the network nodes discussed herein. For example, the example method 1100, or any portion thereof, may be implemented by one or more modules (e.g., an NSI Management Entity) of the example Network Node 1200 (e.g., Mobile AP, Fixed AP, etc.) of FIG. 12.

The example method 1100 begins executing at block 1105. The example method 1100 may begin executing in response to any of a variety of causes or conditions, non-limiting examples of which are presented herein. Block 1105 may, for example, share any or all characteristics with block 905 of the example method 900 of FIG. 9.

The example method 1100 may, at block 1160, comprise defining a beaconing strategy for the node. Such beaconing strategy may, for example, comprise an initial and/or default beaconing strategy. Such beaconing strategy may, for example, comprise an initial and/or default beacon structure (e.g., NSI frame definition, etc.). Such beaconing strategy may, for example, comprise an initial and/or default beacon period, set of conditions under which beacon transmission is started and/or stopped, target number of beacons to transmit, minimum and/or maximum time between beacons, etc.

The example method 1100 may, at block 1165, comprise sending (or transmitting) beacons (e.g., comprising an NSI frame, etc.) in accordance with the beaconing strategy defined at block 1160.

The example method 1100 may, at block 1170, comprise receiving node context information. Block 1170 may comprise receiving the node context information in any of a variety of manners, non-limiting examples of which are provided herein.

The node context information may, for example, comprise any or all of the types of information discussed herein (e.g., as analyzed for the NSI frame sending determination at block 910 and/or block 1010, as analyzed for the NSI frame field determination at block 920 and/or block 1020, etc.).

Block 1170 may, for example, comprise receiving the node context information from various modules or entities of the node. For example, block 1170 may comprise receiving location information from a GPS module, position tracking module, etc. Also for example, block 1170 may comprise receiving channel loading information, data rate information, channel condition information, RF environment information, request and/or command information received from another node, hop count information, etc., from a communication interface module. Additionally for example, block 1170 may comprise receiving time or synchronization information from a timer module, GPS module, etc. Further for example, block 1170 may comprise receiving power supply information from a power supply module. Still further for example, block 1170 may comprise receiving prioritization information from another module. Also for example, block 1170 may comprise tracking beacon transmission count.

Note that block 1170 may also comprise receiving context information in messages from other nodes (e.g., comprising NSI frames, etc.). Such context information may directly and/or indirectly concern the receiving node (i.e., the node implementing various aspects of the example method 1100).

In general, block 1170 may comprise receiving node context information. Accordingly, the scope of this disclosure should not be limited by characteristics of any particular context information and/or of any particular manner of receiving such information.

The example method 1100 may, at block 1175, comprise analyzing the context information received at block 1170. For example, block 1175 may comprise analyzing the context information and determining, based at least in part on the context information, whether and/or how to adapt the beaconing strategy. Block 1175 may comprise performing such analyzing in any of a variety of manners, non-limiting examples of which are provided herein.

For example, block 1175 may comprise determining whether and/or how to adapt the beaconing strategy based, at least in part, on whether particular information (or a signal associated therewith) is available. For example, as shown in the example message sequence chart of FIG. 8, the node (e.g., an NME thereof) may refrain from sending the NSI frame when GPS information (or other location information, motion information, etc.) is not available, may increase the period of periodic NSI frame transmissions, etc. Also for example, block 1175 may comprise including or omitting various fields of the beacon depending on whether the associated information for the fields is available or unavailable, respectively.

For example, block 1175 may comprise determining whether and/or how to adapt the beaconing strategy based, at least in part, on time. For example, the system may mandate that a first beaconing strategy be utilized during a first time window and that a second beaconing strategy be utilized during a second time window. Similarly, the system may mandate that a first set of frames be included in the beacon (e.g., an NSI frame) during a first time window and that a second set of frames (different from the first set of frames) be included in the beacon during a second time window. Also for example, there may be a time deadline associated with the transmission. Thus, if a first beaconing strategy is not meeting the time deadline, then block 1175 may comprise adapting the first beaconing strategy to meet the time deadline. Note that such strategy adaptation may, for example, include shortening the beacon by removing various fields.

Also for example, block 1175 may comprise determining whether and/or how to adapt the beaconing strategy based, at least in part, on number of beacons that have been sent and/or on a target number of beacons to be sent. For example, in an example scenario in which a beacon goal is to transmit a target number of frames, block 1175 may comprise determining to adapt the beaconing strategy to meet the target transmission goal. Such adaptations may, for example, comprise reducing the transmission period for a periodically transmitted beacon, shortening the beacon by removing various fields, etc.

Additionally for example, block 1175 may comprise determining whether and/or how to adapt the beaconing strategy based, at least in part, on location (e.g., based on location of the node sending the beacon, based on the location of other nodes, etc.). For example, in an example scenario in which the node is in a region infamous for channel congestion, block 1175 may comprise determining to change the beaconing strategy from periodic transmission with a relatively short period to periodic transmission with a relatively high period (e.g., to help alleviate channel congestion, etc.). Also for example, in an example scenario in which there are no other nodes within range (or within a particular geographical distance) of the node, block 1175 may comprise determining to refrain from beaconing or to beacon at a reduced rate (e.g., to conserve power, etc.). Additionally for example, in another example scenario, block 1175 may comprise determining to utilize a first beaconing strategy when the node is operating in a first geographical region, and utilize a second beaconing strategy when the node is operating in a second geographical region. Note that the first beaconing strategy and the second beaconing strategy may comprise utilizing different respective sets of fields in the beacons.

Further for example, block 1175 may comprise determining whether and/or how to adapt the beaconing strategy based, at least in part, on channel load (e.g., on number of nodes using the channel, number of users or clients using the channel, amount of data traffic on the channel, etc.). For example, in an example scenario in which a channel is lightly loaded, block 1175 may comprise determining to send the beacon periodically with a relatively short period (e.g., at a relatively high frequency). Also for example, in an example scenario in which the data traffic on the channel is nearing maximum capacity, block 1175 may comprise determining to send the beacon periodically with a relatively long period (e.g., at a relatively low frequency), or to not send the beacon (e.g., ever, for at least a period of time, until the channel clears up, etc.). Note that block 1175 may also, for example, comprise including a field in the beacon that provides information of the channel load, number of users or clients using the channel, amount of data traffic on the channel, etc.

Still further for example, block 1175 may comprise determining whether and/or how to adapt the beaconing strategy based, at least in part, on present channel conditions (e.g., RF environment conditions, signal-to-noise ratio, noise floor level, detected interference on the channel, etc.). For example, in an example scenario in which the noise level on the channel is detected to be above a threshold amount, block 1175 may comprise determining to send beacons periodically with a relatively long period (e.g., at a relatively low frequency), or not to send or defer sending the beacon (e.g., to alleviate, or at least to not add to, noise on the channel, etc.). Also for example, in an example scenario in which the channel is relatively noise free, block 1175 may comprise determining to send the beacon periodically with a relatively short period (e.g., at a relatively high frequency). Note that block 1175 may also adapt the fields in the beacon (e.g., to shorten the beacon transmission, etc.), for example in a scenario in which channel conditions are too poor for transmitting longer beacons.

Also for example, block 1175 may comprise determining whether and/or how to adapt the beaconing strategy based, at least in part, on request or command messages received. Such request or command messages may, for example, originate at another node (e.g., a peer node, an upstream node, a downstream node, a network controller, a cloud server, etc.). Also for example, such request or command messages may originate at another module or entity of the node (e.g., an application, routing control module, connectivity control module, power control module, failover recovery module, etc.). In an example scenario, block 1175 may comprise determining to send beacons based on a command from a network controller to send beacons, to send beacons with or without particular information, etc. In another example scenario, block 1175 may comprise determining to refrain from sending beacons if requested not to do so.

Additionally for example, block 1175 may comprise determining whether and/or how to adapt the beaconing strategy based, at least in part, on hop count. For example, in an example scenario in which the node has received a beacon (or other information) from another node and in which such information is associated with a hop count, block 1175 may comprise determining whether to transmit the received information in a beacon based on whether the hop count (or time to live) limit associated with the received information has been reached. For example, if the received beacon (or NSI information) has a specified maximum hop count of three, and the receipt of the beacon is the third hop, then block 1175 may comprise determining to refrain from transmitting the beacon.

Further for example, block 1175 may comprise determining whether and/or how to adapt the beaconing strategy based, at least in part, on operating conditions of the node. For example, block 1175 may comprise determining to refrain from sending beacons or to defer sending beacons if a limited power supply for the node is running low (e.g., below a threshold, etc.). Also for example, block 1175 may comprise determining to refrain from sending beacons or defer sending beacons if a present error rate is too high. Additionally for example, block 1175 may comprise determining to refrain from sending beacons or to defer sending beacons if an operating temperature of the node is higher than desired (e.g., to reduce heat generation). Further for example, block 1175 may comprise determining to send a beacon that includes a temperature field if the operating temperature is high (e.g., to notify other nodes of a potential overheating or failure condition occurring at the node, etc.). Note that block 1175 may also, for example, comprise determining to include one or more fields in the beacon in which information regarding the operating conditions of the node may be communicated.

Still further for example, block 1175 may comprise determining whether and/or how to adapt the beaconing strategy based, at least in part, on priority. For example, in an example scenario in which the beacon includes one or more fields having high-priority information, block 1175 may comprise determining to send the beacon, for example even when other factors being considered weigh against such sending. Block 1175 may also, for example, comprise determining to include fields within the beacon for the communication of the high-priority information.

Though each of the example decision factors was presented individually, it should be understood that block 1175 may comprise considering any or all of such example factors (and others) in aggregate, for example serially and/or in parallel. For example, any or all of such factors may be considered as components (e.g., equal or weighted components) of a cost function. Also for example, any or all of such factors may be formed into a decision tree in which consideration of a factor (or plurality thereof) directs consideration of a next factor (or plurality thereof) until a leaf of the tree is reached that includes the beaconing strategy decision.

In general, block 1175 may comprise analyzing the context information received at block 1170 (e.g., among other things) to determine whether to continue using the current beaconing strategy or whether and/or how to adapt the beaconing strategy.

The example method 1100 may, at block 1180, comprise directing execution flow of the example method 1100. For example, if it is determined at block 1175 to adapt the beaconing strategy, then block 1180 directs execution flow to block 1185. If, however, it is determined at block 1175 to not adapt the current beaconing strategy, then block 1180 directs execution flow of the example method 1100 back up to block 1165 for continued sending of beacons utilizing the current beaconing strategy.

The example method 1100 may, at block 1185, comprise redefining the beaconing strategy, for example in a manner determined at block 1175. Execution flow of the example method 1000 may then loop back up to block 1165 for continued beacon transmission (e.g., in accordance with the new beacon strategy defined at block 1185).

Figure 12:
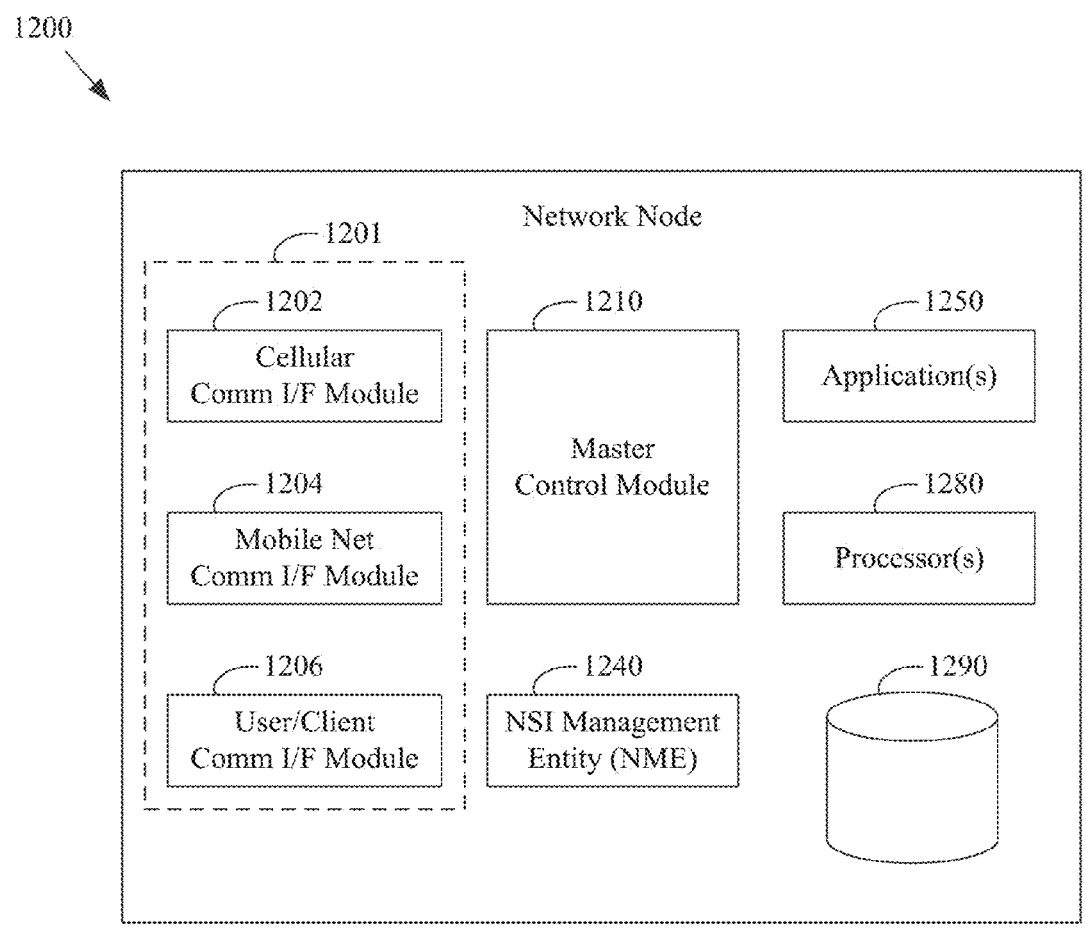
FIG. 12 shows a block diagram of an example network node, in accordance with various aspects of the present disclosure.

FIG. 12 shows a block diagram of various components of an example network node, in accordance with various aspects of the present disclosure. The example node 1200 may, for example, share any or all characteristics with the other example methods, networks, and/or network components 100, 200, 300, 400, 500-570, 600, 700, 800, 900, 1000, and 1100 discussed herein. For example, any or all of the components of the example node 1200 may perform any or all of the method steps presented herein.

The network node 1200 may, for example, comprise an access point (AP) node (e.g., a Mobile AP, a Fixed AP, etc.), any node presented herein, etc. The example node 1200 may comprise a variety of components (or modules), non-limiting examples of which are provided herein.

The example node 1200 may, for example, comprise a communication interface (I/F) module 1201 (e.g., including a cellular communication interface module 1202, mobile network communication interface module 1204, user/client communication interface module 1206, etc.) that operates to perform any or all of the wireless and/or wired communication functionality for the node 1200, many examples of which are provided herein (e.g., communication with sensors external to the node 1200, communication with the onboard diagnostic (OBD) system of a vehicle in which the node 1200 is installed, communication with peer APs, communication between Mobile APs and Fixed APs, communication with Network Controllers, communication with client devices, backhaul communication, Cloud server communication, etc.). The communication interface (I/F) module 1201 may, for example, operate in accordance with any of a variety of cellular communication protocols, 3G, 4G, wireless LAN communication protocols (e.g., Wi-Fi, etc.), wireless PAN communication protocols (e.g., Bluetooth, etc.), 802.11p or DSRC, satellite communication protocols, fiber or cable communication protocols, LAN protocols (e.g., Ethernet, etc.), TCP/IP, etc.

The example node 1200 may, for example, comprise a Node Status Information (NSI) Management Entity (NME) 1240 that operates to manage the NSI Table (NSIT), the communication of beacons (e.g., NSI frames, etc.), etc. The example NME 1240 may, for example, comprise hardware and/or software that operate to implement any or all of the node's NSI, NSIT, and/or NME functionality discussed herein. For example, the NME 1240 may operate to perform any or all blocks of the example methods 900, 1000, and/or 1100, discussed herein.

The example node 1200 may, for example, comprise a Master Control Module 1210 that generally manages operation of the node 1200 at a high level. Such Master Control Module 1210 may, for example, comprise various aspects of an operating system for the node 1200.

The example node 1200 may further, for example, comprise one or more applications 1250 executing on the node 1200 (e.g., client management applications, security applications, power management applications, vehicle monitoring applications, location services applications, sensor interface applications, etc.).

The example node 1200 may also comprise one or more processors 1280 and memory devices 1290. The processor(s) 1280 may, for example, comprise any of a variety of processor characteristics. For example, the processor(s) 1280 may comprise one or more of a general purpose processor, RIS processor, microcontroller, ASIC, DSP, video processor, etc.). The memory device(s) 1290 may, for example comprise any of a variety of memory characteristics. For example, the memory device(s) 1290 may comprise a volatile memory, non-volatile memory, etc. The memory device(s) 1290 may, for example, comprise a non-transitory computer-readable medium that comprises software instructions that when executed by the processor(s) 1280, cause the node 1200 to perform any or all of the functionality discussed herein (e.g., with regard to the example methods discussed herein, etc.). The memory device(s) 1290 may, for example, store NSI Table information (e.g., as maintained by the NME 1240).

In summary, various aspects of this disclosure provide communication network architectures, systems and methods for supporting a network of mobile nodes, for example comprising a combination of mobile and stationary nodes. As non-limiting examples, various aspects of this disclosure provide systems and methods for providing context awareness in a moving network and making network management decisions based at least in part on such awareness. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communication network node comprising:
at least one module comprising a processing circuit and a memory and being operable to, at least:
    transmit a beacon message in accordance with a defined beaconing strategy, wherein the defined beaconing strategy comprises transmitting a first set of types of information fields;
    receive context information comprising one or both of information identifying a physical operating condition and information identifying a power supply status;
    analyze the received context information;
    redefine the beaconing strategy, based at least in part on the analyzed received context information, wherein the redefined beaconing strategy comprises transmitting beacons comprising a second set of types of information fields, the second set being different from the first set; and
    transmit a beacon message in accordance with the redefined beaconing strategy,
    wherein the context information comprises information regarding at least one operating condition of another node, said at least one operating condition of another node comprising one or more of: a physical operating condition, a power supply condition, and an RF channel characteristic.

2. The communication network node of claim 1, wherein:
the defined beaconing strategy comprises transmitting beacons periodically at a first period; and
the redefined beaconing strategy comprises transmitting beacons periodically at a second period different from the first period.

3. The communication network node of claim 1, wherein:
the received context information comprises information identifying a physical operating condition; and
the information identifying a physical operating condition comprises temperature information.

4. The communication network node of claim 1, wherein the context information comprises node channel loading information.

5. The communication network node of claim 1, wherein the context information comprises a request or command from another node.

6. The communication network node of claim 1, wherein the beacon message comprises a node status information frame.

7. The communication network node of claim 1, wherein:
the received context information comprises information identifying a physical operating condition; and
the information identifying a physical operating condition comprises movement information.

8. The communication network node of claim 1, wherein:
the received context information comprises information identifying a power supply status; and
the information identifying a power supply status comprises information indicating that a present power supply for the communication network node is running low.

9. A communication network node comprising:
at least one module comprising a processing circuit and a memory and being operable to at least:
transmit a beacon message in accordance with a defined beaconing strategy, strategy, wherein the defined beaconing strategy comprises transmitting a first set of types of information fields;
receive context information comprising node location information;
analyze the received context information;
redefine the beaconing strategy, based at least in part on the analyzed received context information, wherein the redefined beaconing strategy comprises transmitting beacons comprising a second set of types of information fields, the second set being different from the first set; and
transmit a beacon message in accordance with the redefined beaconing strategy,
wherein the context information comprises information regarding at least one operating condition of another node, said at least one operating condition of another node comprising one or more of: a physical operating condition, a power supply condition, and an RF channel characteristic.

10. The communication network node of claim 9, wherein the node location information comprises information identifying a location of the communication network node.

11. The communication network node of claim 9, wherein the node location information comprises information identifying a location of another communication network node other than the communication network node.

12. The communication network node of claim 9, wherein the node location information comprises node movement information.

13. A communication network node comprising:
at least one module comprising a processing circuit and a memory and operable to, at least:
transmit a beacon message in accordance with a defined beaconing strategy, wherein the defined beaconing strategy comprises transmitting a first set of types of information fields;
receive context information comprising information identifying an amount of data traffic;
analyze the received context information;
redefine the beaconing strategy, based at least in part on the analyzed received context information, wherein the redefined beaconing strategy comprises transmitting beacons comprising a second set of types of information fields, the second set being different from the first set; and
transmit a beacon message in accordance with the redefined beaconing strategy,
wherein the context information comprises information regarding at least one operating condition of another node, said at least one operating condition of another node comprising one or more of: a physical operating condition, a power supply condition, and an RF channel characteristic.

14. The communication network node of claim 13, wherein the information identifying an amount of data traffic comprises communication bandwidth information.

15. The communication network node of claim 13, wherein the information identifying an amount of data traffic comprises information identifying an amount of communication bandwidth available.

16. The communication network node of claim 13, wherein the information identifying an amount of data traffic comprises information identifying an amount of communication bandwidth being utilized.

17. A communication network node comprising:
at least one module comprising a processing circuit and a memory and operable to, at least:
transmit a beacon message in accordance with a defined beaconing strategy, wherein the defined beaconing strategy comprises transmitting a first set of types of information fields;
receive context information from another communication network node, the context information comprising information of at least one RF channel characteristic;
analyze the received context information;
redefine the beaconing strategy, based at least in part on the analyzed received context information, wherein the redefined beaconing strategy comprises transmitting beacons comprising a second set of types of information fields, the second set being different from the first set; and
transmit a beacon message in accordance with the redefined beaconing strategy,
wherein the context information comprises information regarding at least one operating condition of the other communication network node, said at least one operating condition of the other communication network node comprising one or more of: a physical operating condition, a power supply condition, and an RF channel characteristic.

18. The communication network node of claim 17, wherein the information of at least one RF channel characteristic comprises RF channel quality information.

19. A communication network node comprising:
at least one module comprising a processing circuit and a memory and operable to, at least:
transmit a beacon message in accordance with a defined beaconing strategy, wherein the defined beaconing strategy comprises transmitting a first set of types of information fields;
receive context information comprising information of at least one RF channel characteristic;
analyze the received context information;
redefine the beaconing strategy, based at least in part on the analyzed received context information, wherein the redefined beaconing strategy comprises transmitting beacons comprising a second set of types of information fields, the second set being different from the first set; and
transmit a beacon message in accordance with the redefined beaconing strategy,
wherein the information of at least one RF channel characteristic comprises error rate information, and
wherein the context information comprises information regarding at least one operating condition of another node, said at least one operating condition of another node comprising one or more of: a physical operating condition, a power supply condition, and an RF channel characteristic.

* * * * *